May 25, 1965     G. H. WESTMAN     3,185,170

LIQUID PURIFICATION APPARATUS

Filed June 22, 1961

INVENTOR
GEORGE H. WESTMAN
BY
ATTORNEY

United States Patent Office 3,185,170
Patented May 25, 1965

3,185,170
LIQUID PURIFICATION APPARATUS
George H. Westman, 14 Swallow Lane, North Oaks, St. Paul, Minn.
Filed June 22, 1961, Ser. No. 118,794
1 Claim. (Cl. 137—268)

This invention relates to liquid purification apparatus for automatically adding a predetermined quantity of a purifying or other treatment liquid to a proportional quantity of water as it is fed to a storage tank under pressure from a source of supply.

In my copending application Serial No. 30,287, filed May 19, 1960, now Patent 3,056,419 issued October 2, 1962, I have described and claimed liquid purification apparatus which is adapted for use in a water system having an intermittently operating, power-driven pump, the intake of which is connected to a source of supply and the outlet connected to a reservoir such as a pressure tank from which the treated water is drawn. The present invention is adapted for use in systems of the type having such intermittently operating pumps or, where the water is supplied under continuous pressure from a main or other public water supply system. To purify contaminated water and make it potable, a hypochlorite solution is usually added to the water in a concentration of about .2% by weight metered into the water supply to leave residual hypochlorite equal to ½ part to 6 parts per million parts of water. The present invention is particularly adapted to provide chlorination treatment of this character, although it will be evident that other treatment agents may be added in liquid form or in solution by apparatus of the character hereinafter described.

It is an object of my invention to provide simple automatic apparatus for adding an accurately measured quantity of a purifying liquid to water flowing to a storage tank under pressure.

A particular object is to provide for a water system having a storage tank or reservoir, apparatus of the class described including a closed treatment liquid container, an inlet conduit for said treatment liquid container extending to a source of water under pressure, an outlet conduit for said container connected to a relatively low pressure member of a supply conduit and a flow restricting device interposed in the supply conduit between the inlet and outlet connections for the treatment liquid container whereby a predetermined proportional quantity of treatment liquid is added to the water supplied through said conduit to the tank or reservoir.

The invention also includes certain other novel features and details of construction which will be more fully pointed out in the following specification and claim.

Figure 1:
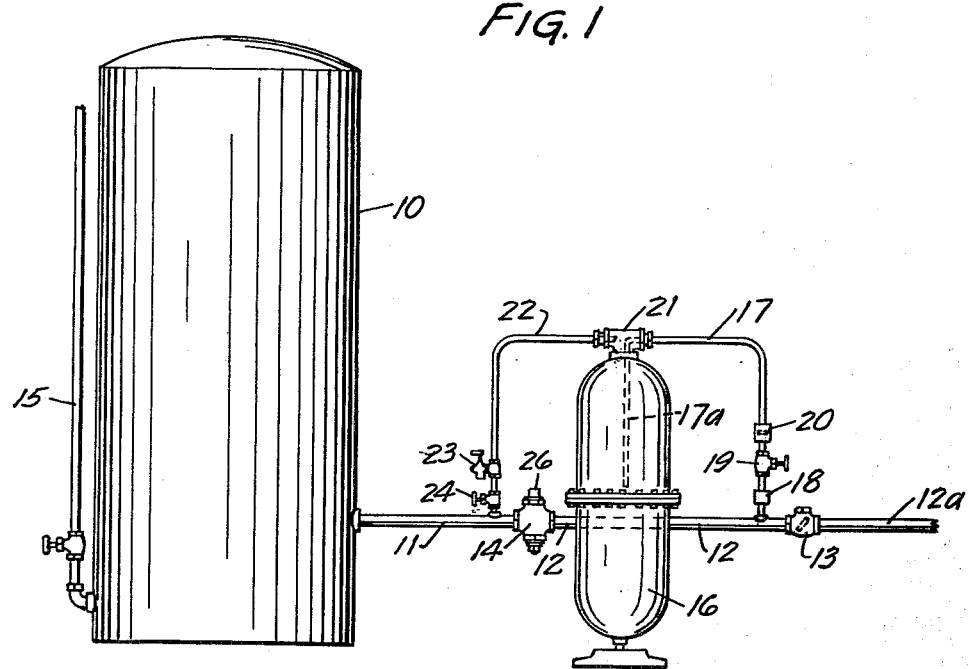
Figure 2:
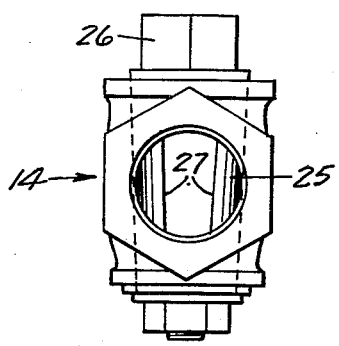
Figure 3:
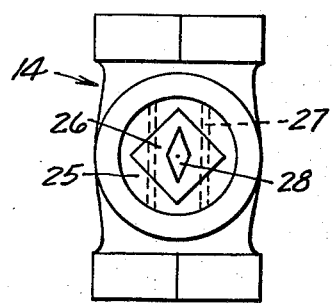

Referring to the accompanying drawing which illustrates, by way of example and not for the purpose of limitation, a preferred embodiment of my invention:

FIGURE 1 is a side elevational, somewhat schematic, view showing my improved treatment apparatus in connection with a water supply system of common type; and FIGS. 2 and 3 are end elevational and top plan views respectively showing a suitable flow restricting device for use with my apparatus.

As shown in FIG. 1, the water system has a storage tank 10 adapted to be supplied with water under pressure through a conduit having a member 11 connected to the tank and a member 12 connected to a source of supply at its end 12a. A check valve 13 is included in the conduit member 12 near its inlet end 12a to prevent flow from the tank 10 back toward the source of supply. The members 11 and 12 of the supply conduit are joined by a flow restricting device 14 which is operative to provide a predetermined range of pressure drop between the conduit members 12 and 11. The pressure drop is a function of the rate of flow through the device 14. A pressure balancing valve providing adjustment of the size of the flow passage is preferably used as the device 14. The outlet from the tank 10 may comprise a service pipe 15 connected to the lower portion of the tank.

A liquid treatment container 16 of the closed pressure type contains a supply of hypochlorite solution and/or other treatment liquid or solution and is supplied with water from the conduit member 12 through a branch 17 thereof having an outlet end 17a located at a predetermined depth in the treatment liquid below the top of the container 16. Included in the conduit 17 adjacent to the conduit member 12 is a sediment strainer 18, followed by a needle valve 19 and an orifice device 20 in the direction of flow. The branch conduit 17 enters the container 16 through a T fitting 21 having a threaded connection with the upper end of the container. A suitable union fitting connects the branch conduit 17 with the fitting 21. An outlet for the treated liquid comprises a branch 22 of the conduit 11 connected to one of the branches of the T fitting 21 and has an intake opening within the T fitting 21 to receive treatment liquid or chlorine solution of a predetermined minimum potency from the top of the container 16. Included in the branch conduit 22 is a drain valve 23 and a shut-off valve 24. These valves, like the needle valve 17, are of the conventional manually operable type.

As shown in FIGS. 2 and 3, the flow restricting device 14 is a pressure balancing valve of the square head plug type having a tapered plug 25 and a square head 26 projecting at the top. A flow passage 27 is formed in the plug 25 and the upper end of the head 26 has an arrow 28 for indicating the degree of restriction and angular position of the plug 25 in the flow passage. The conduit members 11 and 12 are connected to the threaded outlet and inlet ends respectively of the flow passage through the device 14.

The rate of flow through the device 14 and pressure drop from the inlet to the outlet side thereof may be regulated by turning the head 26. An example of a suitable pressure balancing valve is the Crane Company #250 square head cock for one inch supply line. Such a valve is suitable for many domestic water systems supplied with water at pressures within the range 50 to 20 p.s.i. The pressure drop for this valve when fully open at various flow rates is as follows:

| Gallons per minute: | Pressure drop, p.s.i. |
|---|---|
| 1 | .00864 |
| 2 | .02952 |
| 3 | .06048 |
| 4 | .10170 |
| 5 | .15030 |
| 6 | .2106 |
| 8 | .3582 |
| 10 | .5382 |
| 15 | 1.1448 |
| 20 | 1.962 |
| 25 | 3.006 |

It will be evident that when no liquid is flowing through the conduits 12–11 there is no drop of pressure across the device 14 and no treatment liquid is being fed into the water supply conduit or tank 10. Extensive tests have shown that by suitable adjustments of the needle valve 19 and device 14 any selected dosage within the range required by health authorities may be maintained in the tank 10. In most jurisdictions this range is from one-half part hypochlorite per million parts of water to six parts per million. For short periods of time or in unusual situations much higher dosages may be required and relatively large proportions of treatment liquid to water may be provided by maximum opening of the needle valve 19 and greater restriction of the flow through the device 14.

Assuming that the treatment apparatus has been connected to the water system, as hereinbefore described, and that the tank 10 and supply conduit members 11 and 12 are filled with untreated water under pressure, to charge the container 16 with a solid agent from which a treatment liquid or solution may be formed by the addition of water, the needle valve 19 and valve 24 are closed, the conduit branches 17 and 22 are disconnected from the fitting 21 and the latter is removed from the container 16. The charge of solid material in pellet or granular form may be poured into the container 16 to an elevation approximately half way to the top of the container. The fitting connections are thereupon replaced as shown and the flow restricting device 14 is adjusted to fully open position. The needle valve 19 and drain cock 23 are then opened thereby causing the filling of the treatment liquid tank 16 with water and providing the hypochlorite solution or other treatment liquid. When treatment liquid starts to flow from the drain valve 23, the valve 24 is opened and the drain valve 23 is closed. Treatment liquid now flows from the container 16 through the branch conduit 22 to the conduit member 11 and thence into the tank 10 whenever water is withdrawn from the tank so that there is a drop of pressure across the device 14.

When the untreated water in the tank 10 has been replaced with treated water, a test is made for parts per million of hypochlorite or other treatment liquid in the tank by testing the effluent from a fixture outlet. If less than the potency desired in parts per million is found in the water, the needle valve 19 may be adjusted to increase the rate of flow to the container 16. If the test shows a higher dosage than that desired, the dosage may be decreased by partially closing the needle valve 19. Ordinarily the flow restricting device 14 may be retained in open position, but if a higher dosage is needed this device is turned to increase its restricting effect, thereby reducing the rate of flow through the conduit member 11 to the tank 10.

The orifice device 20 provides an upper limit on the rate of flow through the branch conduit 17 to the container 16 and thereby guards against excessive dosage that might be caused by inadvertent wide opening of the needle valve 19. An orifice device having an aperture $\frac{1}{16}$ of an inch in diameter has been found suitable for most domestic water supply systems.

For chlorinating water, the container 16 may be charged with a granular or pelletized chemical compound which will react with water to produce a hypochlorite solution. For example, calcium hypochlorite ($Ca(OCl)_2$) which provides 70% of available chlorine may be used. Such a crystalline material may be charged into the container 16 to a depth which leaves approximately the upper half of the container for the solution. When water is added, a hypochlorite solution fills the upper portion of the container 16, and due to specific gravity variations at various degrees of saturation, is stratified with the lowest concentration or potency in the T fitting 21 from which the solution is withdrawn through the branch conduit 22. The water required to replenish the solution is fed into the container 16 from the lower end 17a of the branch conduit 17 at a depth slightly above the solid material therein. As a result hypochlorite solution at an approximately constant potency equal to about .2% by weight is maintained in the outlet fitting 21.

Use of a hypochlorite solution of such low potency has the important advantage of greatly facilitating the maintenance of a substantially uniform predetermined dosage in the water supply conduit 11 and tank 10. Adjustment of the needle valve 19 and flow restricting device 14 is thereby rendered relatively non-critical even for installations where the pressure of the water supply and rate of flow through the supply conduit varies between wide limits. Thus variations in rate of flow through the supply conduit members 12 and 11 do not require changes in the adjusted positions of either the needle valve 19 or restricting device 14 in order to maintain the dosage within the required range of from ½ to 6 parts of residual chlorine per million parts of water.

The size of the container 16 may be varied between wide limits, but it has been found that a container of approximately 4½ gallon capacity will provide the average domestic water system with adequate chlorination for a period of many months without recharging. When recharging becomes necessary, the valves 19 and 24 are closed, the branch conduits 17 and 22 are disconnected from the fitting 21 and the latter is removed from the container 16 to provide an opening for recharging, as hereinbefore described.

The sediment strainer 18 is provided to protect the needle valve 19 and orifice 20 from such sediment as may be present in the raw water supply. For installations where a corrosive substance such as chlorine is to be used, a suitable corrosion resistant material such as glass or glass fiber reinforced plastic may be used as a lining for the container 16 and suitable synthetic resins or plastics may be molded to form the branch conduit 22, drain cock 23, shut-off valve 24 and other parts with which the corrosive liquid comes in contact.

It will be evident that my invention is not limited to water chlorination, and the apparatus and principle of operation may be used to advantage for automatically adding other treatment liquids in measured quantities to water or other liquids. The water fed to a swimming pool, for example, may be chlorinated or otherwise treated by adding the treatment liquid in a predetermined concentration or proportion to the water supplied to the pool through a conduit such as the conduit 11.

A further advantageous feature of my treatment apparatus is its simplicity and low cost. There are relatively few parts and most of these are standard and readily available valves and fittings.

I claim:

Water purification apparatus comprising: a water supply conduit having a first member connected to a source of water under pressure and a second conduit member; a manually adjustable first valve interconnecting said first conduit member to said second conduit member for effecting a pressure drop between said members which varies proportionately to the rate of flow of water therethrough, said first valve being set to a position to provide a predetermined range of pressure drop in accordance with the flow rate; a container normally filled with a stratified treating solution which varies in density from a substantially saturated solution in the lower portion of said container to a solution of substantially constant, relatively low potency in the upper portion of said container; a branch conduit of said first conduit member connected at a point substantially removed upstream from said first valve and connected to said container for supplying water under pressure directly into said substantially saturated solution in said container; and a branch conduit of said second conduit member connected thereto at a point substantially removed downstream from said first valve and communicating with the upper portion of said container for supplying treating solution from the container to said second conduit member; an adjustable needle valve controlling flow through said branch from said first conduit member and set for restricting the flow to said container to a degree whereby the proportion of treating solution supplied by the branch of said second conduit member is in the range of ½ to 6 parts per million parts of water passing through said second conduit member irrespective of the rate of flow of water through said first valve.

(References on following page)

References Cited by the Examiner

UNITED STATES PATENTS

| | | | |
|---|---|---|---|
| 461,235 | 10/91 | Butler | 23—272.7 |
| 985,757 | 2/11 | Haws | 251—118 X |
| 1,681,362 | 8/28 | Pike | 23—272.8 |
| 2,532,973 | 12/50 | Wallentin et al. | 137—205.5 |
| 2,628,129 | 2/53 | Hosmer et al. | 23—272.7 |
| 2,683,622 | 7/54 | Dragon | 23—272.7 |
| 2,989,979 | 6/61 | Karlson | 137—268 |

M. CARY NELSON, *Primary Examiner.*